United States Patent Office 3,113,588
Patented Dec. 10, 1963

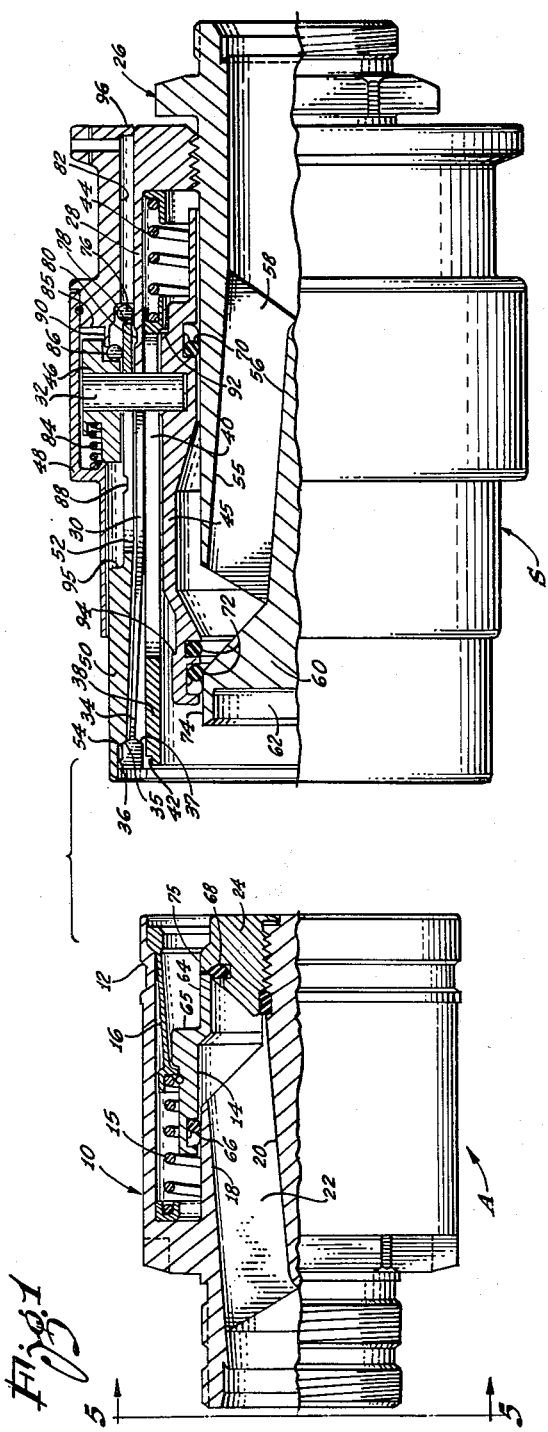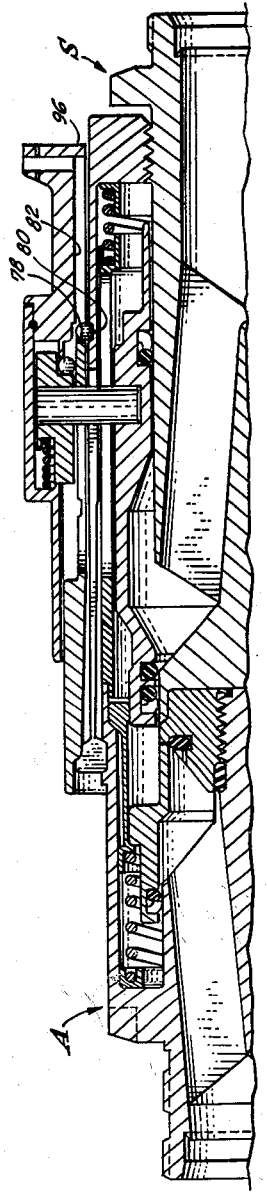

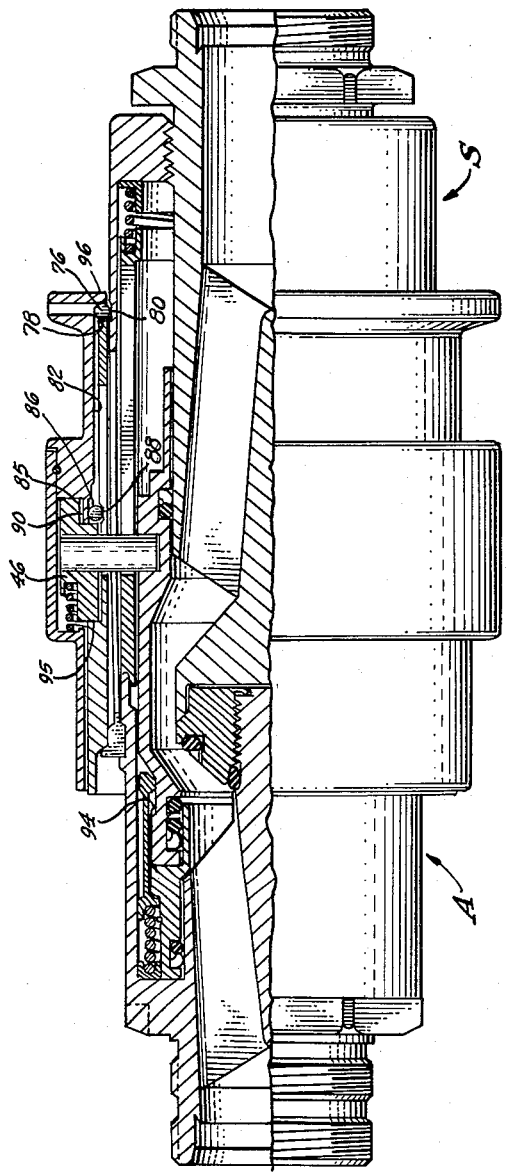

3,113,588
FLUID CONDUIT COUPLING
Jorge Torres, Los Angeles, Calif., assignor to On Mark Couplings, Inc., Los Angeles, Calif., a corporation of California
Filed May 9, 1960, Ser. No. 27,733
23 Claims. (Cl. 137—614.06)

This invention relates to a coupling assembly for interconnecting two passage members for flow therethrough of fluid under high pressure. More particularly, the invention pertains to a quick disconnect coupling of the type in which two coupling bodies interlock automatically when forced together telescopically and in which at least one of the coupling bodies incorporates a valve for control of the high pressure fluid. The invention is specifically directed to certain problems that arise in the construction of such a coupling assembly for various uses.

One problem to which the invention is directed is to provide such a coupling assembly for use with high pressure fluids wherein the valve cannot be opened unless the two coupling bodies are safely connected together and, conversely, the interconnected coupling bodies cannot be released from each other unless the valve is closed. The solution to this problem requires an inherent cycle of operation in which an actuating means is movable through a range in opposite directions with means provided to connect and disconnect the two coupling bodies in response to movement of the actuating means through one portion of this range and with means provided to open and close the valve during a separate portion of the range. Thus movement of the actuating means through the whole range from a normal retracted position to an extended position results first in locking of the two coupling bodies together and results subsequently in opening of the valve. On the other hand, the return movement of the actuating means through the whole range first closes the valve and thereafter disengages the interconnecting means to release the two coupling bodies from each other.

Another problem is to provide such a valve assembly for use with fluids under high pressure, for example 4,000 p.s.i. or higher, in which the operating cycle for connecting and disconnecting the two coupling bodies and for opening and closing the valve may be carried out easily by simply manually shifting an actuating sleeve in one direction. The difficulty is that since only a minor portion of the range of movement of the actuating sleeve is used to lock or unlock the two coupling bodies, the major portion of the range involves high mechanical frictional resistance to movement of the sleeve, this frictional resistance arising from the effect of the high fluid pressure on the interlocking means. To clarify this difficulty, the actuating sleeve performs its locking operation by telescoping over some type of engagement means such as a circumferential series of collet fingers to confine the engagement means radially in its contracted position of engagement with one of the coupling bodies. The high magnitude separation force created by the high fluid pressure in the coupling causes components of force to tend to expand the confined engagement means outward against the surrounding actuating sleeve to resist the axial valve-actuating movement of the sleeve.

Another serious problem arises when a spring urges the valve towards its open position and some kind of latch holds the valve closed when the coupling body is disconnected, the latch being designed for release automatically by the relative telescoping movement of the two coupling bodies. In the present embodiment of the invention, for example, what is termed a stay-back sleeve is normally telescoped inside the engagement means of the separated coupling to keep the engagement means expanded and the expanded engagement means blocks the opening movement of the valve. If a valve spring is used, there is the possibility that the stay-back sleeve may be inadvertently retracted to free the valve for spring-actuated opening movement with serious and hazardous results.

To meet all these requirements, the invention provides a first coupling body with a normally closed valve therein, a second coupling body with a normally closed second valve and an actuating sleeve on the second body to open the second valve and to push the second valve against the first valve for opening of the first valve. Radially contractible engagement means is provided to interconnect the two coupling bodies automatically when the two coupling bodies are moved together in telescoped relation and a special locking sleeve separate from the actuating sleeve is provided to confine and thereby lock the engagement means. The use of a special locking sleeve to separate the locking function from the valve-operating function leaves the actuating sleeve free for only valve operation over a major portion of its range. Thus the valve operation is carried out with no resistance whatsoever arising from the fluid pressure separation force acting between the two coupled bodies.

During the relatively small initial portion of the range of movement of the actuating sleeve that is utilized for locking the two coupling bodies together, the locking sleeve is operatively connected to the actuating sleeve for actuation thereby. When the actuating sleeve leaves this initial portion of its range, the locking sleeve is automatically locked in its locking position and the actuating sleeve is automatically released from the locking sleeve for independent valve-actuating movement.

Since the operating cycle for sequentially interconnecting the two coupling bodies and opening the two valves cannot be initiated unless the two coupling bodies are telescoped together in position for interlocking engagement, and since the first portion of the cycle in which the coupling bodies are locked together does not overlap the second portion in which the two valves open, the coupling assembly is inherently foolproof. The two valves cannot open unless the coupling bodies are interlocked and the interlocked coupling bodies cannot be separated unless the two valves are closed.

The problem of making the open valve of a coupling body non-responsive to the flowing fluid is solved by positively locking the valve in its open position. A feature of the invention in this regard is the concept of providing spring-biased lost motion in the operating connection between the actuating sleeve and the valve with the valve latch releasable in response to the lost motion. With the valve latched open, the valve may be released for closing action simply by shifting the actuating sleeve relative to the valve to take up the spring-biased lost motion. The actuating sleeve has three distinct functions since it not only operates the locking sleeve to lock the two coupling bodies together and operates the valve but also operates the latch for releasably holding the valve open.

An important advantage of providing a latch to hold the valve open is that it makes it possible to eliminate the usual spring that continuously urges the valve towards its open position. With the usual valve spring eliminated, the valve may be designed to be balanced with respect to fluid pressure so that neither spring pressure nor fluid pressure acts on the valve when the coupling body is disconnected. Thus the problem is solved of avoiding any tendency of the valve to open with hazardous results when the stay-back sleeve of the disconnected coupling body is inadvertently retracted.

The features and advantages of the invention may be understood by reference to the following detailed description together with the accompanying drawings.

In the drawings, which are to be regarded as merely illustrative:

FIG. 1 is a view partly in longitudinal section and partly in side elevation showing the two coupling bodies of the selected embodiment of the invention, the two coupling bodies being disconnected and separated from each other;

FIG. 2 is a view similar to FIG. 1 showing the two coupling bodies moved together at an intermediate stage in the procedure of interconnecting the two coupling bodies; and FIG. 3 is a similar view showing the two coupling bodies completely interlocked with each other.

In the selected embodiment of the invention shown in the drawings, the two cooperating coupling bodies comprise an adapter fitting, generally designated by the letter A, which, for example, may be mounted on a missile flush with the missile skin, and a socket fitting, generally designated by the letter S, which may be mounted on the end of a flexible hose (not shown). FIG. 1 shows the socket S close to the adapter A in position for axial movement into interlocking engagement with the adapter.

The principal parts of the adapter A include: an adapter body 10 formed with an outer circumferential locking shoulder 12; a slide valve 14 which is urged towards its normal closed position by a coil spring 15; a circumferential series of normally disengaged latching fingers 16 carried by the slide valve 14; and a fixed axial structure which cooperates with the slide valve. This fixed structure comprises: an inner cylinder 18 on which the slide valve is slidingly mounted; an axial body 20 which is integrally connected with the inner cylinder 18 by longitudinal radial webs 22; and a nose member 24 threaded onto the outer end of the axial body 20.

The principal parts of the socket S include: a socket body 26; a collet sleeve 28 which may be considered a part of the socket body since it is fixedly mounted thereon by screw threads, the collet sleeve having a plurality of circumferentially spaced longitudinal slots 30 to clear corresponding radial pins 32; engagement means in the form of a circumferential series of flexible collet fingers 34 that are formed by the collet sleeve 28, each collet finger having an outer camming shoulder 35, an outer stop shoulder 36 and an inner locking shoulder 37 for engagement with the locking shoulder 12 of the adapter body, the collet fingers being preferably biased radially outward to their release positions; a stay-back sleeve 38 that is normally at a forward position inside the circumferential series of collet fingers 34 to prevent inward flexure of the collet fingers out of their release positions, the stay-back sleeve being formed with circumferentially spaced longitudinal slots 40 to clear the radial pins 32, respectively, and being formed with a rim recess 42 to permit the stay-back sleeve to telescope slightly into the rim of the adapter body 10; a coil spring 44 which urges the stay-back sleeve 38 towards its normal forward position; a slide valve 45 which is normally closed; an actuating means comprising an actuating ring 46 and an associated actuating sleeve 48, the actuating ring being operatively connected to the slide valve 45 by the previously mentioned radial pins 32; a locking means in the form of a locking sleeve 50 having a plurality of circumferentially spaced longitudinal slots 52 to clear the radial pins 32, respectively, the locking sleeve being formed with an inner circumferential camming shoulder 54 which normally abuts the camming shoulder 35 of the collet fingers 34; and a fixed axial structure for cooperation with the slide valve 45. This fixed axial structure comprises: an inner cylinder 55 integral with the socket body 26; and an axial body 56 that is integrally connected with the inner cylinder 55 by longitudinal radial webs 58, the axial body having a nose portion 60 that is formed with a forward recess 62 to receive the nose member 24.

The slide valve 14 of the adapter has a forward cylindrical portion 64 of reduced diameter and is formed with an adjacent radial shoulder 65 for abutment by the second slide valve 45 of the socket. The slide valve 14 is provided with an O-ring 66 for sliding sealing engagement with the previously mentioned inner cylinder 18. At its forward position shown in FIG. 1, the slide valve makes sealing contact with a fixed O-ring 68 that is carried by the nose member 24.

The second slide valve 45 that is incorporated in the socket is a balanced valve in the sense that when the valve is in the closed position shown in FIG. 1, the effective area of the valve that is acted upon by the fluid to urge the valve forward is equal to the effective area that is acted upon by the fluid to urge the valve rearward. The valve carries a rearward O-ring 70 in sliding sealing contact with the previously mentioned inner cylinder 55 and further carries a pair of forward inner circumferential O-rings 72. In the closed position of the valve shown in FIG. 1, the leading O-ring 72 embraces the cylindrical surface 74 of the nose portion 60 in a sealing manner.

When the adapter and socket mate in the coupling operation, the nose member 24 of the adapter seats in the previously mentioned recess 62 in the nose portion 60 of the socket. At such time, the cylindrical surface 74 of the socket nose and the cylindrical surface 75 of the adapter nose, together with the cylindrical portion 64 of the slide valve 14, form a combined cylindrical surface of uniform diameter for cooperation with the pair of O-rings 72 of the socket slide valve 45. During the advance or opening movement of the socket slide valve 45, this arrangement permits the O-rings 72 to slide in a sealing manner across the noses of the two coupling bodies onto the cylindrical portion 64 of the slide valve 14 to reach abutment with the radial shoulder 65 and then act against the radial shoulder to push the adapter valve to its open position.

Since the socket slide valve 45 is balanced with respect to fluid pressure, it may be moved easily even though it confines fluid under exceedingly high pressure, say pressure execeeding 3,000 p.s.i. The adapter slide valve 14 is not balanced in the same manner, however, so that opening movement of this slide valve is opposed by any fluid pressure that may exist inside the adapter. When, however, the socket slide valve 45 advances into abutment with the radial shoulder 65 of the adapter slide valve 14, fluid is released from the socket into the adapter to balance the adapter slide valve 14 in the same manner as the socket slide valve 45.

The socket is provided with what may be termed a first latch member 76 in the form of a split ring for alternate cooperation with two different latch recesses. The first latch recess 78 is an inner circumferential recess formed in the actuating sleeve 48. The second latch recess 80 is a circumferential groove on the outer surface of the collet ring 28 which, as heretofore stated, is to be regarded as part of the socket body 26. When the split ring or first latch member 76 is in the first latch recess groove 78, as shown in FIG. 1, it serves as means for operatively connecting the actuating sleeve 48 with the locking sleeve 50 to permit the actuating sleeve to push the locking sleeve forward and, conversely, to permit the locking sleeve to serve as means to block forward movement of the actuating sleeve. When the first latch member 76 is in the second latch groove 80, as shown in FIG. 3, and is trapped in that groove by an inner circumferential surface 82 of the actuating sleeve 48, the latch member abuts the rear edge of the locking sleeve 50 to prevent rearward movement thereof relative to the socket body 26. The latch member 76 may, if desired, comprise one or more metal balls instead of a split ring.

The actuating sleeve 48 has a lost motion connection with the actuating ring, i.e., has freedom for a small range of movement relative to the actuating ring 46. Thus the actuating sleeve 48 is movable relative to the actuating ring 46 between one limit position shown in FIG. 1 and an alternate limit position shown in FIG. 3. This lost motion is biased by a confined coil spring 84 that yieldingly urges the actuating sleeve 48 to the left as viewed in FIG. 3 to press an inner circumferential shoulder 85 of the actuating sleeve against the rear end of the actuating ring.

This lost motion or relative movement between the actuating sleeve 48 and the actuating ring 46 is employed for a latch operation which involves what may be termed a second latch member 86 which cooperates with a first circumferential recess or latch groove 88 (FIG. 1) in the locking sleeve 50. In this embodiment of the invention, the second latch member 86 is also in the form of a resilient split ring, but here again, one or more balls may be employed in the same manner for the same purpose. The actuating sleeve 46, which is made in two parts for the purpose of assembly, is formed with an inner circumferential locking flange 90 which is shaped and dimensioned to confine the latch member 86 in the latch groove 88 when the parts are positioned as shown in FIG. 3.

In the normal position of the parts of the socket when the socket is separated from the adapter, as shown in FIG. 1, an inner circumferential shoulder of the stay-back sleeve 38 abuts an outer circumferential shoulder 92 of the slide valve 45. By this arrangement, the slide valve 45 serves as stop means to keep the stay-back sleeve in its normal retracted position in opposition to the pressure of the stay-back sleeve spring 44.

*Operation*

In the normal disconnected state of the socket S shown in FIG. 1, the pressure of the spring 44 against the stay-back sleeve 38 is transmitted by the stay-back sleeve to the slide valve 45, as just stated, and this pressure is transmitted by the radial pins 32 to the actuating ring 46. The actuating ring 46 in turn transmits the pressure to the actuating sleeve 48 to urge the actuating sleeve forward. The actuating sleeve in turn transmits the pressure to the first latch member 76. The latch member 78 abuts the rear end of the locking sleeve 50 and urges the locking sleeve forward against the camming shoulders 54 of the radially expanded collet fingers 34. The radially expanded collet fingers prevent advance of the locking sleeve 50 and the first latch member 78 in abutment against the actuating sleeve 48 prevents retraction of the locking sleeve. The actuating sleeve 48 cannot retract because such retraction is blocked by the actuating ring 46, the radial pins 32 carried by the actuating ring being at the rear ends of the slots 30 of the collet sleeve 28. It is apparent in FIG. 1 that since the stay-back sleeve 38 holds the series of collet fingers 34 in their expanded state and the expanded collet fingers block the path of forward advance of the locking sleeve 50, retraction of the stay-back sleeve 38 to permit contraction of the collet fingers 34 would free the locking sleeve 50 for forward movement with corresponding forward movement of the actuating sleeve 48 and the slide valve 45.

There are several stages in the operation of interconnecting the adaptor and the socket and opening the two slide valves 14 and 45. This operation is carried out by advancing the socket S into telescopic relation with the adapter A, the end of the adapter body 10 telescoping into the end of the socket body 26, i.e., telescoping into the circumferential series of collet fingers 34 and the nose 24 of the adapter telescoping into the nose recess 62 of the socket.

As the socket is advanced into this telescoped relation with the adapter, the stay-back sleeve 38 encounters the rim of the adapter body 10 and is thereby retracted in opposition to the force exerted by the coil spring 44. As the stay-back sleeve 38 retracts, the adapter body telescopes into the series of collet fingers to keep the collet fingers in their expanded state. At the final telescoped position of the socket relative to the adapter, the collet fingers are advanced sufficiently to contract into engagement with the locking shoulder 12 of the socket body 10. The contraction of the collet fingers 34 is facilitated by the camming shoulder 54 of the locking sleeve 50. The locking sleeve 50 is then free to advance a short distance to where the camming shoulder 54 of the locking sleeve abuts the outer stop shoulders 36 of the collet fingers. At this intermediate stage in the coupling operation, the parts are in the positions shown in FIG. 2.

Since the stay-back sleeve 38 compresses the stay-back sleeve spring 44, there is no spring-engendered force to urge the locking sleeve 50, actuating sleeve 48 and slide valve 45 forward from the positions shown in FIG. 1 to the positions shown in FIG. 2. It is to be borne in mind, however, that the actuating sleeve 48 is manually grasped for the purpose of advancing the socket into engagement with the adapter and manual force is continuously exerted to advance the actuating sleeve until the coupling operation is completed.

When the locking sleeve 50 advances into abutment with the outer stop shoulders 36 of the collet fingers 34 in the manner shown in FIG. 2, it does so because the manual advancing force applied to the actuating sleeve 48 is transmitted to the locking sleeve 50 through the first latch member 76. This limited advance movement of the locking sleeve 50 permits the actuating sleeve 48 and the slide valve 45 to advance to the positions shown in FIG. 2.

It will be noted in FIG. 2 that while the sleeve valve 45 has advanced, nevertheless the two forward O-rings 72 are both in sealing contact with the cylindrical surface 74 of the nose portion 60. Thus while the slide valve 45 has advanced, it is still closed at the end of this first portion of the range of advance of the actuating sleeve 48. It is apparent, then, that the two coupling bodies are positively interlocked with the locking sleeve 50 in its locking position while the slide valve 45 is still closed.

As heretofore stated, during this first portion of the range of advance of the actuating sleeve 48, the first latch member 76 pushes the locking sleeve forward to its locking position. When this initial portion of the advance is completed, however, the first latch member 76 drops out of the first latch recess 78 of the actuating sleeve 48 into the second latching recess or circumferential groove 80 of the collet sleeve 28. The manual force applied to the actuating sleeve 48 causes the actuating sleeve to facilitate the seating of the latch member 76 in the second latch groove 80 by cam action. Thereafter, the actuating sleeve is free to advance independently of both the first latch member 76 and the locking sleeve 50. During any further advance of the actuating sleeve 48, its previously mentioned inner circumferential surface 82 effectively confines or locks the first latch member 76 in the second latch groove 80.

In FIG. 2, the leading end of the socket slide valve 45 telescopes into the leading ends of the latching fingers 16. With continued advance of the actuating sleeve 48, the slide valve 45 is continued in its advance by the radial pins 32 and the leading end of the slide valve telescopes over the cylindrical portion 64 of the adapter slide valve 14 and abuts the radial shoulder 65 of the slide valve. The final advance of the slide valve 45 pushes the slide valve 14 to its retracted open position shown in FIG. 3 so that both of the two slide valves are open for fluid flow through the coupling. As the adapter slide valve 14 is retracted in this manner, the latching fingers 16 are radially contracted by cam action into engagement with the leading end of the slide valve 45 rearward of a latching shoulder 94 of the slide valve.

During the valve-opening advance of the actuating sleeve 48, the locking flange 90 of the actuating sleeve pushes against the second latch member 86 and the second latch member 86 in turn pushes against the actuating ring 46. At the end of the advance of the actuating sleeve 48, the second latch member 86 drops into the third latch recess or groove 88 and then the coil spring 84 acting between the actuating ring 46 and the actuating sleeve 48 causes a further final advance of the actuating sleeve to move the locking flange 90 of the actuating sleeve forward into position to confine or lock the second latch member in the groove 88 as shown in FIG. 3.

In FIG. 3, the actuating ring 46 is immobilized. Any tendency for the actuating ring to advance is blocked by abutment of the actuating ring against a shoulder 95 of the locking sleeve 50 and, of course, advance of the locking sleeve is blocked by the outer stop shoulders 36 of the expanded collet fingers 34. It may also be noted that further advance of the actuating sleeve 48 may be prevented by an inner radial stop flange 96 of the actuating sleeve abutting the seated first latch member 76 as may be seen in FIG. 3. Any tendency for the actuating ring 46 to retract is transmitted in FIG. 3 to the seated second latch member 86 which in turn transmits such tendency to the locking sleeve 50. In turn, retraction of the locking sleeve 50 is blocked by the seated and confined first latch member 76. Since the actuating ring 46 is immobilized in this manner, it holds the slide valve 45 in its advanced open position in a positive manner. Thus the second latch member 86 functions to lock both of the two slide valves in their open positions to resist any tendency for the two valves to be opened by fluid pressure arising from venturi action or any other causes.

To disconnect the two couplings, the actuating sleeve 48 is manually retracted from the position shown in FIG. 3. The initial rearward movement of the actuating sleeve 48 retracts the locking flange 90 from the second latch member 86 to unlock the actuating ring 46 and thereby unlock the opened slide valve 45. The unlocking of the actuating ring 46 frees the actuating sleeve 48 for further retraction. Further retraction of the actuating sleeve 48 along with the actuating ring 46 causes corresponding retraction of the slide valve 45 and the latching shoulder 94 of the slide valve 45 engages the enlarged ends of the latching fingers 16 whereby the slide valve 45 pulls the adapter slide valve 14 closed. At the fully closed position of the slide valve 14, the radially outwardly biased latching fingers 16 expand out of engagement with the slide valve 45.

As the retracting slide valve 45 returns to the nose portion 60 of the socket, it uncovers the adapter nose 24 to release fluid under pressure trapped between the two noses. The trapped fluid is vented to the surrounding annular space inside the two interlocked coupling bodies. During this retraction of the slide valve 45 to the point at which it cuts off flow through the socket, the two coupling bodies remain interconnected with the collet fingers 34 engaging the locking shoulder 12 of the socket and with the locking sleeve 50 confining the collet fingers in their locking positions.

During this retraction of the actuating sleeve, the inner circumferential surface 82 of the actuating sleeve keeps the first latch member 76 seated in the latch groove 80 to prevent retraction of the locking sleeve 50. When the retracting actuating sleeve 48 reaches the position shown in FIG. 2, however, the first latching recess 78 registers with the seated first latch member 76 to permit the latch member 76 to expand radially into the first latch recess. At this point, the radial pins 32 which are carried rearward by the actuating ring 46 abut the rear ends of the slots 52 of the locking sleeve 50 to transmit rearward force to the locking sleeve. If the first latch member 76 does not expand out of the second latch groove 80, it is now caused to do so by the retraction of the locking sleeve by the radial pins 32. The locking sleeve then is completely retracted by the radial pins from the locking position shown in FIG. 2 to the release position shown in FIG. 1. The socket slide valve 45 continues to retract to the position shown in FIG. 1 and, of course, remains closed as it does so.

The retraction of the locking sleeve 50 from the position relative to the collet fingers 34 shown in FIG. 2 to the position relative to the collet fingers shown in FIG. 1 permits the collet fingers to flex radially out of engagement with the locking shoulder 12 of the adapter. At the same time, the radial pins 32 reach the rear ends of the slots 30 in the collet sleeve 28 and thereby stop the retraction of the actuating sleeve 48.

Thereafter, the rearward manual force applied to the actuating sleeve is transmitted to the socket body 26 to withdraw the socket body from the adapter body 10. During the initial withdrawal of the socket body, the collet fingers 34 slide over the periphery of the adapter body 10 onto the stay-back sleeve 38, the stay-back sleeve being advanced by the stay-back spring 44. Thus the collet fingers are maintained in their expanded state to block any tendency of the locking sleeve 50 to advance.

The provision of the locking sleeve 50 as a member separate and apart from the actuating sleeve 48 frees the actuating sleeve of the usual function of confining and locking the engagement means, i.e., the collet fingers 38. Thus the actuating sleeve 48 is free to move with only negligible resistance as it shifts the slide valve 45 to its open position.

This feature of the invention involves making the locking sleeve 50 responsive to only an initial minor portion of the range of movement of the actuating sleeve 48. The first latch member 76 functions to operatively connect the locking sleeve 50 with the actuating sleeve 48 during only the short distance of movement of the latch member from the position shown in FIG. 1 to the alternate position shown in FIG. 2. In this regard, a feature of the invention is the dual function of the latch member 76 in that it serves as means for operatively connecting the locking sleeve 50 with the actuating sleeve 48 during the initial portion of the range of advance of the actuating sleeve and thereafter is immobilized in the latch groove 80 to lock the locking sleeve in its forward position as the actuating sleeve continues to advance.

When the socket is separated from the adapter, there is always a possibility of the stay-back sleeve 38 being inadvertently retracted to permit the slide valve 45 to open. Any such retraction of the stay-back sleeve, however, compresses the stay-back sleeve spring 44 to relieve the slide valve 45 of any spring pressure whatsoever. Consequently, any inadvertent retraction of the stay-back sleeve does not result in opening of the socket slide valve by spring pressure. Since the slide valve is balanced with respect to fluid pressure and is not acted upon by any spring means, it tends to remain in its closed position and especially so because of the fluid pressure exerted on the sealing O-rings of the slide valve.

My description in specific detail of the selected embodiment of the invention will suggest various changes, substitutions and other departures from my disclosure within the spirit and scope of the appended claims.

I claim:

1. A coupling assembly for releasably interconnecting a first passage means and a second passage means, comprising: a first coupling body and a second coupling body for mounting on the ends of said first and second passage means respectively; engagement means on said second coupling body to releasably engage said first coupling body for interconnecting the two coupling bodies; actuating means on said second coupling body movable from a normal retracted position to an extended position relative thereto; a normally closed valve in said second coupling body to control fluid flow therethrough, said valve being responsive to said actuating means to remain closed over an initial portion of the range of movement of the actuating means from its normal position and to open over a later portion of the range; a locking means movable from a retracted position to a locking position to lock said engagement means in its engaging position; and means to connect said locking means with said actuating means for locking movement thereby over said initial portion of the range and to disconnect the locking means from the actuating means over said later portion of the range.

2. A combination as set forth in claim 1 which includes means to immobilize said locking means at its locking position in response to advance of said actuating means beyond said initial portion of said range.

3. A combination as set forth in claim 1 which includes manually releasable means on said second body to releasably latch said actuating means at its extended valve-opening position.

4. A coupling assembly for releasably interconnecting a first passage means and a second passage means, comprising: a first coupling body and a second coupling body for mounting on the ends of said first and second passage means respectively, said first coupling body being shaped and dimensioned at its outer end to telescope into the end of the second coupling body; engagement means on the outer end of the second coupling body to contract radially from a normal expanded state into engagement with the telescoped end of the first coupling body to interconnect the two bodies; a locking sleeve slidingly surrounding said second coupling body to move from a normal retracted position to a forward position over a given range to lock said engagement means in its engagement position, said engagement means in its normal expanded state blocking the path of forward movement of said locking sleeve to its locking position; a stay-back sleeve inside said engagement means to normally keep said engagement means expanded and thereby restrain said locking sleeve at its normal retracted position, said stay-back sleeve being positioned and dimensioned for retraction from its normal position by said first coupling body as the two coupling bodies telescope together thereby to release said engagement means for contraction to permit forward movement of the locking sleeve; a normally closed valve inside said second coupling body for controlling fluid flow therethrough; an actuating sleeve slidingly surrounding said locking sleeve for movement from a normal retracted position to a forward position over a range substantially longer than said given range, said actuating sleeve being operatively connected to said valve to open the valve by its forward motion; and means to operatively connect said locking sleeve with said actuating sleeve for movement of the locking sleeve through said given range as the actuating sleeve moves initially away from its normal retracted position and to disconnect the locking sleeve from the actuating sleeve at the end of said given range.

5. A coupling assembly as set forth in claim 4 which includes a normally closed valve in said first coupling body responsive to said first-mentioned valve to open when the first-mentioned valve opens while the two coupling bodies are connected.

6. A coupling assembly for releasably interconnecting a first passage means and a second passage means, comprising: a first coupling body and a second coupling body for mounting on the ends of said first and second passage means respectively; engagement means on said second body radially contractible from an expanded state into engagement with the first coupling body for interconnecting the two coupling bodies; a locking member on said second coupling body for advancement from a retracted position to a locking position to confine and lock said engagement means in its retracted state, said engagement means in its expanded state blocking the path of advance of the locking member; a stay-back sleeve inside said engagement means movable between a forward position at which it holds the engagement means expanded thereby blocking the locking member and a rearward position at which it frees the engagement means for contraction; spring means to urge said stay-back sleeve forward; a normally closed valve in said second body to control flow therethrough; manually operable actuating means on said second body operatively connected to said valve and movable forward from a retracted position to an advanced position to open the valve and vice versa; means to retract said locking member in response to retraction of said actuating means thereby to unlock said engagement means for radial expansion and subsequent advance of said stay-back sleeve; means responsive to retraction of said locking member to block advance of the retracted actuating sleeve whereby the actuating sleeve may then be advanced only if the stay-back sleeve is retracted to permit said engagement means to contract for freeing the locking member for advance to its locking position; and means to latch said locking member in its locking position in response to advance of said actuating means to its advanced valve-opening position.

7. A combination as set forth in claim 6 which includes retractable means to latch said actuating means at its advanced valve-opening position.

8. A combination as set forth in claim 6 which includes means to latch said actuating means automatically at its advanced valve-opening position in response to movement of the actuating means to its advanced position, said last mentioned latching means being manually releasable.

9. A combination as set forth in claim 6 in which said valve and the actuating means connected thereto are floating means in the sense that they are free from forces tending to their advancement when the stay-back sleeve is retracted, whereby said valve does not tend to open in response to inadvertent retraction of the stay-back sleeve; and which includes a manually releasable latch to hold said actuating means at its advanced valve-opening position.

10. A coupling assembly for releasably interconnecting a first passage means and a second passage means, comprising: a first coupling body and a second coupling body for mounting on the ends of said first and second passage means respectively; engagement means on said second body radially contractible from an expanded state into engagement with the first coupling body for interconnecting the two coupling bodies; a locking sleeve on said second body for advancement from a retracted position to a locking position to confine and lock said engagement means in its retracted state; a normally closed valve in said second body to control flow therethrough; actuating means on said second body operatively connected to said valve for advance through a given range to open the valve; a latch member; a first recess on said actuating means to receive said latch member for operatively connecting the actuating member with the locking sleeve for advance of the locking sleeve to its locking position by advance of said actuating means over an initial portion of said range; and a second recess in said second body adjacent said locking sleeve to receive said latch member from said first recess in response to movement of the actuating means beyond said initial portion of its range, said second recess being positioned for said latch member to latch said locking sleeve in its locking position.

11. A combination as set forth in claim 10 which includes: a second latch member movable with said actuating means throughout said range; a third recess in said second body adjacent said actuating means to receive said second latch member to latch the actuating sleeve at its advanced valve-opening position; and retractable spring-pressed means carried by said actuating means to urge said second latch member into said third recess in response to movement of the actuating means to its advanced valve-opening position.

12. A coupling assembly for releasably interconnecting a first passage means and a second passage means, comprising: a first coupling body and a second coupling body for mounting on the ends of said first and second passage means respectively; means on said second coupling body to releasably engage said first coupling body for interconnecting the two coupling bodies; a normally closed valve in said second coupling body; manually operable actuating means on the exterior of said second body to open and close the valve, said actuating means having a lost motion operating connection with the valve; spring means normally taking up said lost motion; and a latch means to releasably hold said valve at its open position, said latch means being responsive to said lost motion against said spring means whereby with the valve open and latched, initial movement of the actuating means in its valve-closing direction releases the latch means to free the valve.

13. A coupling assembly as set forth in claim 12 in which a normally closed valve is incorporated in said first coupling body and is pushed to open position by the valve in the second coupling body whereby latching the valve in the second coupling body latches both valves open.

14. A coupling assembly for releasably interconnecting a first passage means and a second passage means, comprising: a first coupling body and a second coupling body for mounting on the ends of said first and second passage means respectively; engagement means on said second coupling body to releasably engage said first coupling body for interconnecting the two coupling bodies; actuating means on said second coupling body movable from a normal retracted position to an extended position relative thereto; a normally closed valve in said second coupling body to control fluid flow therethrough, said valve being responsive to said actuating means to remain closed over an initial portion of the range of movement of the actuating means from its normal position and to open over a later portion of the range, said actuating means having a spring-biased lost motion operating connection with said valve; a locking means movable from a retracted position to a locking position to lock said engagement means in its engaging position; means to connect said locking means with said actuating means for locking movement thereby over said initial portion of the range and to disconnect the locking means from the actuating means over said later portion of the range; means to immobilize the locking means in response to disconnection of the locking means from the actuating means; and means to latch said valve in its open position at the end of said range of movement of the actuating means, said latch means being responsive to said lost motion to release when the actuating means initiates its return movement over said range.

15. A coupling assembly as set forth in claim 14 in which a normally closed valve is incorporated in said first coupling body and is pushed to open position by the valve in the second coupling body whereby latching the valve in the second coupling body latches both valves open.

16. A coupling assembly for releasably interconnecting a first passage means and a second passage means, comprising:
a first coupling body and a second coupling body for mounting on the ends of said first and second passage means respectively;
means on said second coupling body to releasably engage said first coupling body for interconnecting the two coupling bodies;
a normally closed valve in said second coupling body;
actuating means on said second coupling body operatively connected to said valve and movable from a first position to a second position to open the valve;
means to releasably lock said valve in its open position, said locking means being responsive to said actuating means to lock the valve in response to movement of the actuating means to said second position and to release the valve in response to movement of the actuating means away from said second position; and
means to yieldingly retain the actuating means at its second position.

17. A coupling assembly for releasably interconnecting a first passage means and a second passage means, comprising:
a first coupling means and a second coupling means for mounting on the ends of said first and second passage means respectively;

a releasable means to lock said two coupling means together;
a first normally closed valve in said first coupling means to close off said first passage means;
a second normally closed valve in said second coupling means to close off said second passage means, said first valve being responsive to said second valve when the two coupling means are interlocked to open when the second valve opens and to close when the second valve closes;
an actuating means on said second coupling means movable through a given range relative thereto, said locking means being responsive to a first portion of said range to lock the two coupling means together and said second valve being responsive to a second portion of the range, with the second valve closing in response to movement of the actuating means toward said first portion of the range and vice-versa, and with said locking means locking in response to movement of the actuating means toward said second portion of the range and vice-versa, whereby said two valves are always closed when said locking means is released for separation of the two coupling means;
a first fixed axial structure in said first coupling means;
a second fixed axial structure in said second coupling means, said two fixed axial structures mating when the two coupling means are locked together; means to place the juncture between the two fixed axial structures in communication with the fluid confined by the two locked coupling means when the two valves are open, said second valve and second fixed structure being shaped and dimensioned for the second valve to uncover the juncture between the two fixed axial structures to release the pressure of the fluid trapped between the two axial structures to the atmosphere as the second valve withdraws from the first valve while the two valves are closed and while the two coupling means are still locked together whereby separation pressure between the two fixed axial structures is terminated before the two coupling means are unlocked from each other.

18. A coupling assembly for releasably interconnecting a first passage means and a second passage means, comprising:
a first coupling means and a second coupling means for mounting on the ends of said first and second passage means respectively;
releasable means to lock said two coupling means together;
a first normally closed sleeve valve in said first coupling means to close off said first passage means;
a second normally closed sleeve valve in said second coupling means to close off said second passage means, said first sleeve valve being responsive to said second sleeve valve when the two coupling means are interlocked to open when the second sleeve valve opens and to close when the second sleeve valve closes;
an actuating means on said second coupling means movable through a given range relative thereto, said locking means being responsive to a first portion of said range to lock the two coupling means together and said second sleeve valve being responsive to a second portion of the range, with the second sleeve valve closing in response to movement of the actuating means toward said first portion of the range and vice-versa, and with said locking means locking in response to movement of the actuating means toward said second portion of the range and vice-versa, whereby said two sleeve valves are always closed when said locking means is released for separation of the two coupling means;
a structure in said first coupling means spanning at least the major portion of the area defined by the inner circumference of the first sleeve valve;

a second structure in said second coupling means spanning at least the major portion of the area defined by the inner circumference of the second sleeve valve, said two structures mating when the two coupling means are locked together; means to place the juncture between the two structures in communication with the fluid confined by the two locked coupling means when the two sleeve valves are open, said second sleeve valve and said second structure being shaped and dimensioned for the second sleeve valve to uncover the juncture between the two structures to release the pressure of the fluid trapped between the two structures to the atmosphere as the second sleeve valve withdraws from the first sleeve valve while the two sleeve valves are closed and while the two coupling means are still locked together whereby the separation pressure between the two structures is terminated before the two coupling means are unlocked from each other.

19. A coupling assembly for releasably interconnecting a first passage means and a second passage means, comprising:
    a first coupling body and a second coupling body for mounting on the ends of said first and second passage means, respectively;
    actuating means on said second coupling body movable through a given range relative thereto from a normal retracted position to an advanced position;
    engagement means on said second body operable in response to an initial portion of said range of movement of the actuating means to releasably engage the first coupling body for mechanically interconnecting the two coupling bodies;
    normally closed valves in the two coupling bodies respectively responsive to a later portion of said range of movement of the actuating means to open for fluid flow through the two coupling bodies, and
    means responsive to the movement of said actuating means to vent to the atmosphere fluid confined between the two coupling bodies during the retraction of the actuating means through said range after the two valves close and before the actuating means releases said engagement means.

20. The combination of:
    a first passage means and a second passage means;
    a first coupling body and a second coupling body mounted on the ends of said first and second passage means respectively;
    a longitudinal slot in said second body;
    an actuating means on said second coupling body movable axially of the second valve body from a release position through a given range of movement;
    a valve member in said second coupling body;
    means extending from said actuating means through said longitudinal slot in said second body and fixedly interconnecting the actuating means and the valve member for movement in unison through said given range;
    means cooperative with said valve member to cut off flow through said second coupling body during an initial portion of said range in the valve opening direction and to permit flow during the remaining portion of said range;
    and normally releasable means for locking said two coupling bodies together, said releasable locking means being responsive to said actuating means through said initial portion of the given range to lock said coupling bodies together.

21. The combination of:
    a first passage means and a second passage means;
    a first coupling body and a second coupling body mounted on the ends of said first and second passage means respectively;
    a primary actuating means on said second coupling body movable from a release position through a given range of movement;
    a secondary actuating means on said second coupling body;
    means to connect said secondary actuating means with said primary actuating means for movement thereby through an initial portion of said given range and to disconnect the secondary actuating means from the primary actuating means through the rest of said given range;
    means on said second coupling body to releasably engage said first coupling body for interconnecting the two coupling bodies, said releasably engaging means being responsive to said secondary actuating means;
    a valve member in said second coupling body;
    means extending through at least one longitudinal slot in said second body and at least one longitudinal slot in said secondary actuating means to connect said primary actuating means with said valve member for movement of the valve member by the primary actuating means through said given range of movement.
    and means cooperative with said valve member to close off said second coupling body through said initial portion of said given range of movement.

22. The combination of:
    a first passage means and a second passage means;
    a first coupling means and a second coupling means mounted on the ends of said first and second passage means respectively and for movement relative to each other from separated positions into mutual abutment;
    a first normally closed valve in said first coupling means to close off said first passage means;
    a second normally closed valve in said second coupling means to close off said second passage means, said first valve being responsive to said second valve when the two coupling means are interlocked to open when the second valve opens and to close when the second valve closes;
    means on said second coupling means to engage said first coupling means and positively interlock the two coupling means in response to said relative movement between the two coupling means; and
    means to open said second valve in response to continued movement of the two coupling means subsequent to their interlocking.

23. A combination as set forth in claim 22 which includes means to interlock the two valves in response to opening movement of the first valve.

References Cited in the file of this patent

UNITED STATES PATENTS

| | | |
|---|---|---|
| 663,947 | Warsing | Dec. 18, 1900 |
| 2,552,543 | Earle et al. | May 15, 1951 |
| 2,553,680 | Scheiwer | May 22, 1951 |
| 2,637,572 | Bruce | May 5, 1953 |
| 2,643,140 | Schiewer | June 23, 1953 |
| 2,678,834 | Courtot | May 18, 1954 |
| 2,854,259 | Clark | Sept. 30, 1958 |
| 2,951,713 | Hoffstrom | Sept. 6, 1960 |
| 2,962,303 | Ramberg et al. | Nov. 29, 1960 |
| 3,028,179 | Abramoska | Apr. 3, 1962 |
| 3,039,794 | De Cenzo | June 19, 1962 |